(12) United States Patent
Matsui

(10) Patent No.: US 9,533,680 B2
(45) Date of Patent: Jan. 3, 2017

(54) HYBRID VEHICLE CONTROL DEVICE

(71) Applicant: NISSAN MOTOR CO., LTD., Yokohama-shi, Kanagawa (JP)

(72) Inventor: Hiroki Matsui, Ebina (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 7 days.

(21) Appl. No.: 14/654,667

(22) PCT Filed: Dec. 20, 2013

(86) PCT No.: PCT/JP2013/084272
§ 371 (c)(1),
(2) Date: Jun. 22, 2015

(87) PCT Pub. No.: WO2014/103938
PCT Pub. Date: Jul. 3, 2014

(65) Prior Publication Data
US 2015/0314778 A1 Nov. 5, 2015

(30) Foreign Application Priority Data

Dec. 25, 2012 (JP) ................................ 2012-280505

(51) Int. Cl.
*B60W 20/40* (2016.01)
*B60W 20/00* (2016.01)
(Continued)

(52) U.S. Cl.
CPC .............. *B60W 20/40* (2013.01); *B60K 6/387* (2013.01); *B60K 6/48* (2013.01); *B60K 6/547* (2013.01);
(Continued)

(58) Field of Classification Search
CPC ............. B60K 6/485; B60K 6/00; B60K 6/04; B60K 6/42; B60K 6/54; B60K 6/48; B60K 20/40; B60W 10/02; B60W 10/026; B60W 20/00; B60W 10/08; F16H 61/14
See application file for complete search history.

(56) References Cited

U.S. PATENT DOCUMENTS

| 5,231,898 A | 8/1993 | Okura |
| 6,396,165 B1 * | 5/2002 | Nagano .................... B60K 6/42 |
| | | 290/40 R |

(Continued)

FOREIGN PATENT DOCUMENTS

| JP | 2-142965 A | 6/1990 |
| JP | 2000-190758 A | 7/2000 |

(Continued)

*Primary Examiner* — Behrang Badii
(74) *Attorney, Agent, or Firm* — Foley & Lardner LLP

(57) ABSTRACT

Present invention provides a control device for hybrid vehicle which can ensure acceleration performance while suppressing second clutch engagement shock at engine start. The control device has second clutch (CL2) which is interposed between motor/generator (MG) and driving wheels (rear-left and right wheels RL, RR) and whose transmission torque capacity is variable, a second clutch slip amount controlling section (400b) performing full engagement operation that shifts second clutch (CL2) from slip state to full engagement state at a time when lock-up condition of the second clutch (CL2) is satisfied (S107) in the slip state of the second clutch (CL2). The second clutch slip amount controlling section (400b) first increases transmission torque capacity of second clutch (CL2) at first increase gradient (R1) (S109) and subsequently increases the transmission torque capacity of the second clutch (CL2) at second increase gradient (R2) that is gentler than the first increase gradient (R1) (S111).

6 Claims, 12 Drawing Sheets

(51) Int. Cl.
    *B60W 10/02*     (2006.01)
    *B60W 10/10*     (2012.01)
    *B60K 6/48*      (2007.10)
    *B60K 6/547*     (2007.10)
    *B60L 11/14*     (2006.01)
    *B60W 10/06*     (2006.01)
    *B60W 10/08*     (2006.01)
    *F02D 29/02*     (2006.01)
    *B60K 6/387*     (2007.10)
    *B60L 11/18*     (2006.01)
    *B60L 15/20*     (2006.01)
    *F16D 48/06*     (2006.01)

(52) U.S. Cl.
    CPC .......... *B60L 11/14* (2013.01); *B60L 11/1862* (2013.01); *B60L 15/2054* (2013.01); *B60W 10/02* (2013.01); *B60W 10/026* (2013.01); *B60W 10/06* (2013.01); *B60W 10/08* (2013.01); *B60W 10/10* (2013.01); *F02D 29/02* (2013.01); *F16D 48/062* (2013.01); *B60L 2240/12* (2013.01); *B60L 2240/16* (2013.01); *B60L 2240/421* (2013.01); *B60L 2240/423* (2013.01); *B60L 2240/441* (2013.01); *B60L 2240/443* (2013.01); *B60L 2240/507* (2013.01); *B60L 2240/547* (2013.01); *B60L 2240/549* (2013.01); *B60L 2260/26* (2013.01); *B60L 2270/145* (2013.01); *B60W 2540/10* (2013.01); *B60W 2710/024* (2013.01); *B60W 2710/0666* (2013.01); *B60W 2710/081* (2013.01); *B60Y 2300/429* (2013.01); *F16D 2500/1066* (2013.01); *F16D 2500/50236* (2013.01); *F16D 2500/50239* (2013.01); *F16D 2500/50287* (2013.01); *F16D 2500/50293* (2013.01); *F16D 2500/50858* (2013.01); *F16D 2500/70426* (2013.01); *F16D 2500/70428* (2013.01); *Y02T 10/6221* (2013.01); *Y02T 10/6286* (2013.01); *Y02T 10/645* (2013.01); *Y02T 10/70* (2013.01); *Y02T 10/705* (2013.01); *Y02T 10/7005* (2013.01); *Y02T 10/7044* (2013.01); *Y02T 10/7077* (2013.01); *Y02T 10/72* (2013.01); *Y02T 10/7275* (2013.01); *Y10S 903/93* (2013.01)

(56) References Cited

U.S. PATENT DOCUMENTS

| | | | |
|---|---|---|---|
| 2003/0186778 A1* | 10/2003 | Yamamoto | B60K 6/485 477/5 |
| 2007/0056784 A1 | 3/2007 | Joe et al. | |
| 2014/0302964 A1* | 10/2014 | Kobayashi | B60K 6/48 477/5 |

FOREIGN PATENT DOCUMENTS

| | | |
|---|---|---|
| JP | 2007-069817 A | 3/2007 |
| JP | 2009-208562 A | 9/2009 |
| WO | WO 2009/109831 A1 | 9/2009 |

* cited by examiner

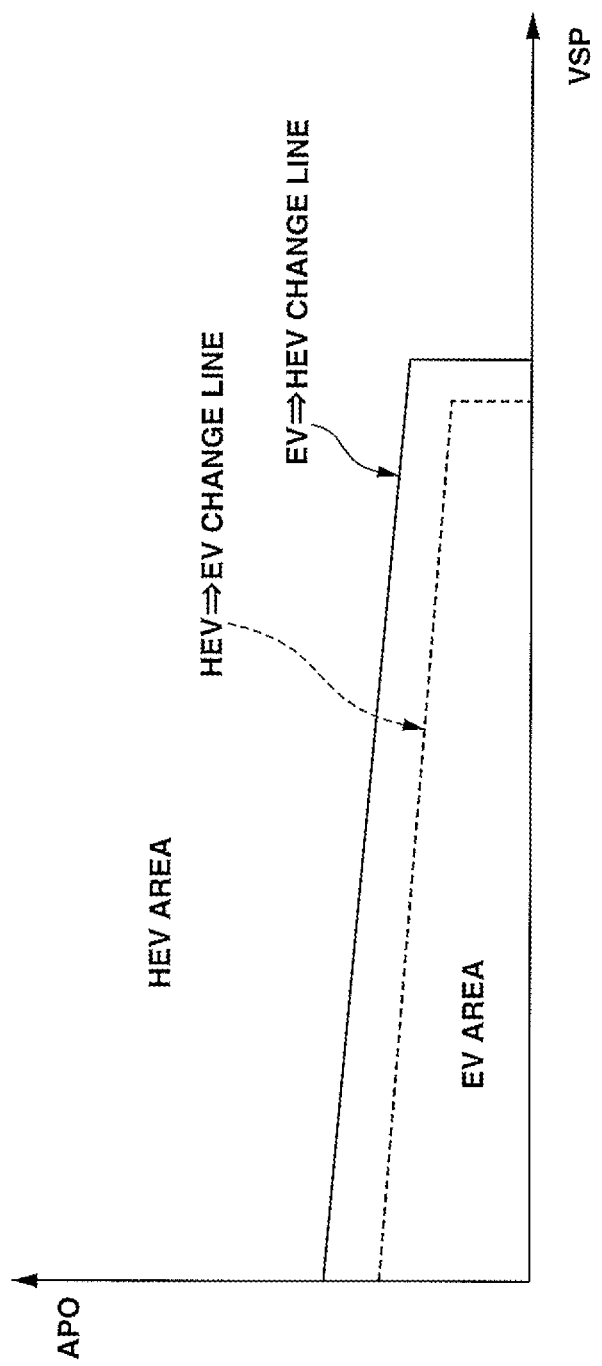

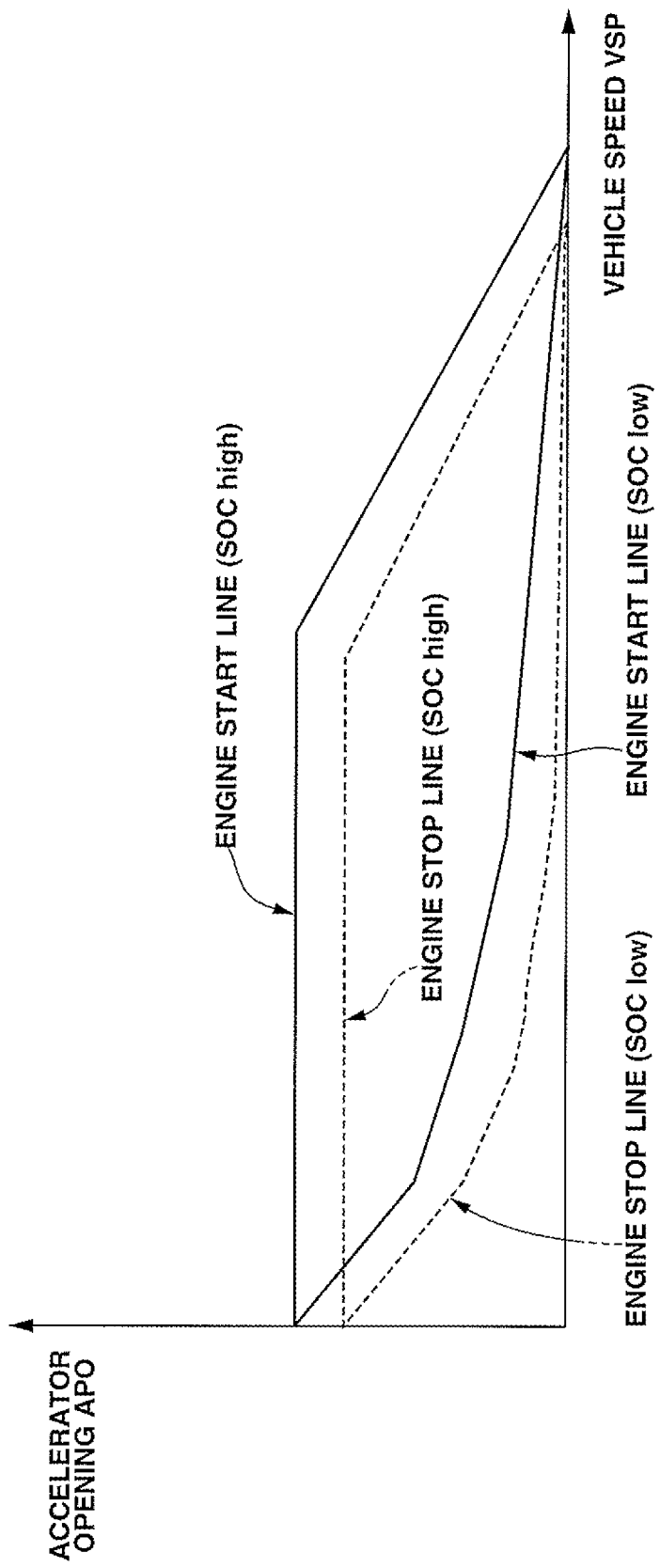

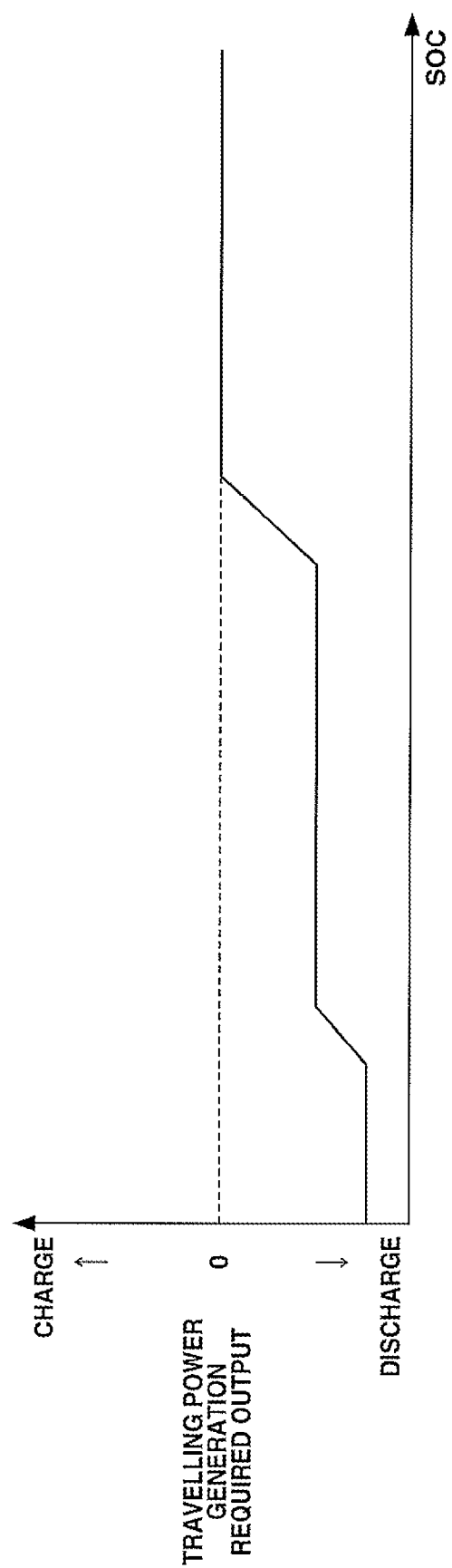

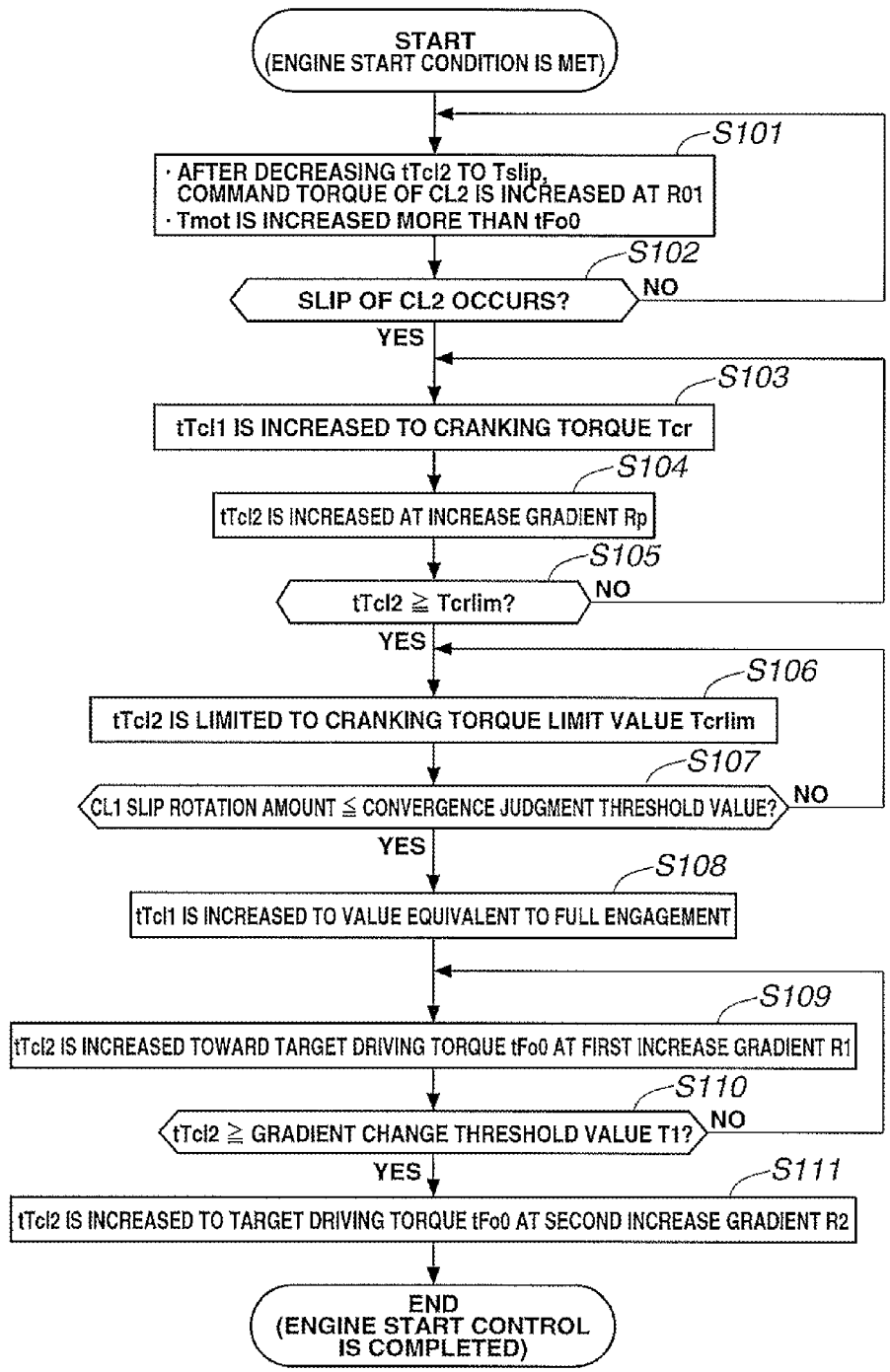

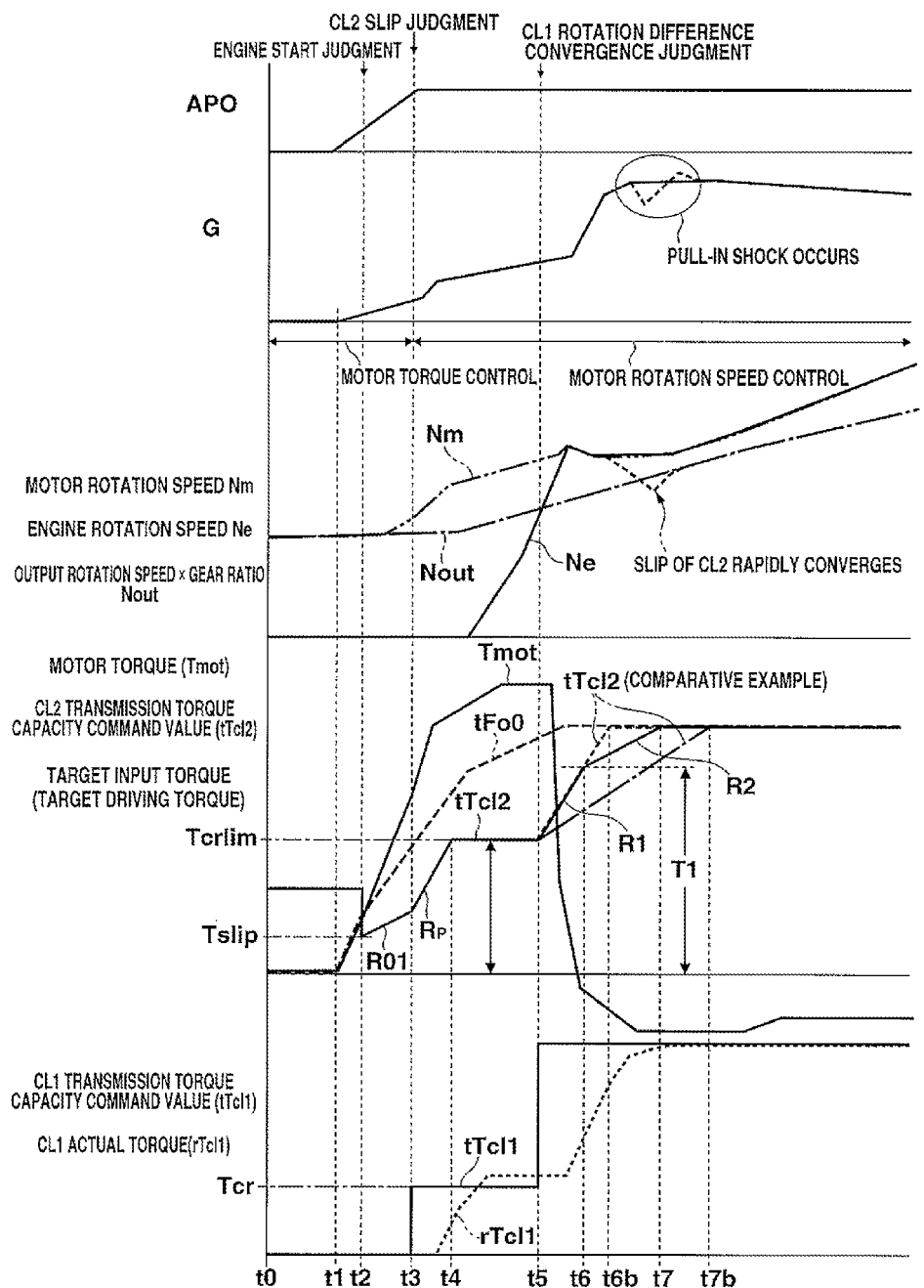

HYBRID VEHICLE CONTROL DEVICE

TECHNICAL FIELD

The present invention relates to a control device for a hybrid vehicle, and more particularly to a control of a second clutch interposed between a drive source and a driving wheel at a time of a full engagement of the second clutch.

BACKGROUND ART

There has been known a hybrid vehicle having a first clutch that is capable of varying a transmission torque capacity between an engine as a drive source and a motor/generator and a second clutch that is capable of varying a transmission torque capacity between the motor/generator and a driving wheel side (for instance, Patent Document 1).

In this related art technique, at a time of execution of an engine start control explained below, after the second clutch is brought into a slip state, a control that shifts the second clutch to a full engagement state is performed.

That is, when executing the engine start control, first the second clutch is brought into the slip state and also a driving torque of the motor/generator is increased, then by engaging the first clutch, the engine is started. After that, when an engine rotation speed is increased, after the first clutch is engaged, the second clutch is controlled from the slip state toward the full engagement state.

CITATION LIST

Patent Document 1: Japanese Patent Application Kokai Publication No. 2007-69817

SUMMARY OF THE INVENTION

Technical Problem

In the above related art technique, however, a gradient of increase in the transmission torque capacity when the second clutch is shifted from the slip state to the full engagement state after the engine start is set to a uniform value. For this reason, in a case where this increase gradient is set to be relatively steep for the purpose of improving an acceleration performance, there arises a problem of causing a shock at a time of the engagement of the second clutch. On the other hand, in order to suppress this engagement shock, if the increase gradient is set to be relatively gentle, there arises a problem of worsening the acceleration performance.

The present invention was made in view of the above problems, and an object of the present invention is to provide a control device for the hybrid vehicle which is capable of ensuring the acceleration performance while suppressing the shock at a time of the full engagement when shifting the second clutch from the slip state to the full engagement state.

Solution to Problem

To achieve the above object, the control device for the hybrid vehicle has a second clutch slip amount controlling section that performs a full engagement operation that shifts the second clutch from a slip state to a full engagement state at a time when a predetermined lock-up condition of the second clutch is satisfied in the slip state of the second clutch, and when the second clutch is shifted from the slip state toward the full engagement state, the second clutch slip amount controlling section first increases a transmission torque capacity of the second clutch at a first increase gradient and subsequently increases the transmission torque capacity of the second clutch at a second increase gradient that is gentler than the first increase gradient.

Effects of Invention

In the present invention, when shifting the second clutch from the slip state to the full engagement state, the second clutch slip amount controlling section first increases the transmission torque capacity of the second clutch at the first increase gradient and subsequently increases the transmission torque capacity of the second clutch at the second increase gradient that is gentler than the first increase gradient.

Thus, as compared with a case where the transmission torque capacity of the second clutch is increased at a constant increase gradient that is gentler than the first increase gradient, high acceleration feeling can be secured. On the other hand, as compared with a case where the transmission torque capacity of the second clutch is increased at a constant increase gradient that is steeper than the second increase gradient, an occurrence of the engagement shock can be suppressed.

In this manner, the present invention can ensure the acceleration performance while suppressing the shock at the time of the full engagement of the second clutch.

BRIEF DESCRIPTION OF DRAWINGS

FIG. 3 is a drawing showing an EV-HEV selection map used when performing a mode selection process in the integrated controller.

FIG. 5 is an area line showing an electric travel (EV) mode area and a hybrid travel (HEV) mode area, of the driving torque control device for the hybrid vehicle of the embodiment 1.

FIG. 6 is a drawing of a characteristic line showing a target charge/discharge amount characteristic with respect to a battery charge state, of the driving torque control device for the hybrid vehicle of the embodiment 1.

FIG. 11 is a flow chart showing a flow of an engine start control process of the control device for the hybrid vehicle of the embodiment 1.

FIG. 13 is a time chart showing an example of operation when performing the engine start control process, of the control device for the hybrid vehicle of the embodiment 1.

EMBODIMENTS FOR CARRYING OUT THE INVENTION

Figure 1:
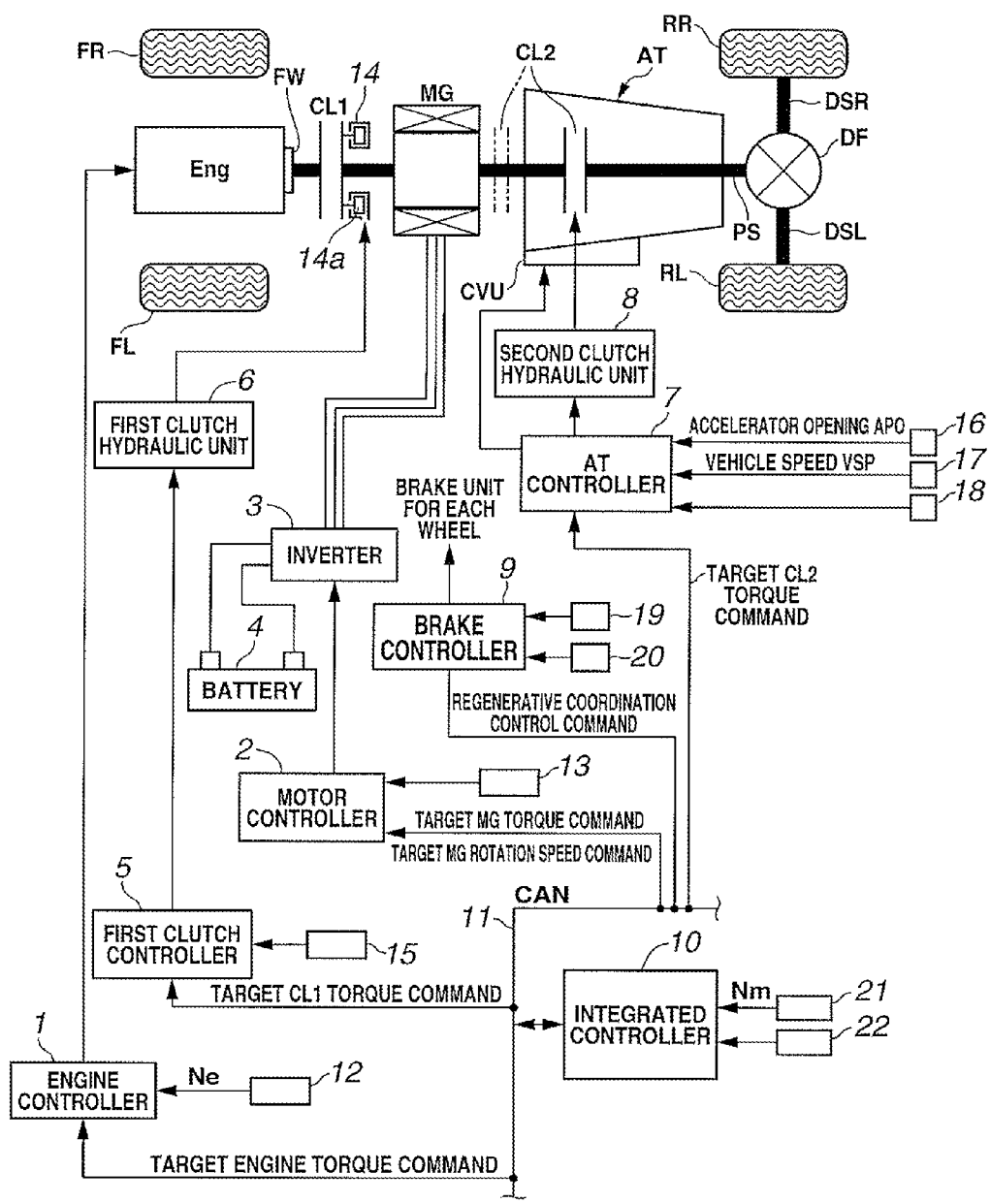
FIG. 1 is a general system diagram showing a rear-wheel-drive hybrid vehicle to which a driving torque control device for a hybrid vehicle of an embodiment 1 is applied.

In the following description, best mode that realizes a control device for a hybrid vehicle of the present invention will be explained according to an embodiment shown in the drawings.

Embodiment 1

First, a configuration of the control device for the hybrid vehicle of an embodiment 1 will be explained.

Regarding the explanation of the configuration, the configuration of the control device for the hybrid vehicle of the embodiment 1 will be separately explained by "Configuration of power train", "Configuration of control system", "Configuration of integrated controller" and "Configuration of engine start control process".

[Configuration of Power Train]

First, a configuration of power train of the hybrid vehicle of the embodiment 1 will be explained.

FIG. 1 is a general system diagram showing a rear-wheel-drive hybrid vehicle to which a driving torque control device for the hybrid vehicle of the embodiment 1 is applied.

A driveline of the hybrid vehicle of the embodiment 1 has, as shown in FIG. 1, an engine Eng, a flywheel FW, a first clutch CL1, a motor/generator MG, a second clutch CL2, an automatic transmission AT, a propeller shaft PS, a differential gear DF, a left drive shaft DSL, a right drive shaft DSR, a rear-left wheel (driving wheel) RL, a rear-right wheel (driving wheel) RR, a front-left wheel FL and a front-right wheel FR.

The engine Eng is a gasoline engine or a diesel engine. On the basis of an engine control command from an engine controller 1, an engine start control, an engine stop control and a valve opening control of a throttle valve are carried out. As shown in FIG. 1, the flywheel FW is provided at an engine output shaft.

The first clutch CL1 is a clutch that is interposed between the engine Eng and the motor/generator MG. Engagement and disengagement including half clutch state or partial clutch engagement state, of this first clutch CL1, are controlled by a first clutch control pressure that is produced by a first clutch hydraulic unit 6 on the basis of a first clutch control command from a first clutch controller 5. As the first clutch CL1, for example, a dry single disc clutch whose engagement and disengagement are controlled by a hydraulic actuator 14 having a piston 14a is used.

The motor/generator MG is a synchronous motor/generator in which a permanent magnet is embedded in a rotor and a stator coil is wound around a stator. On the basis of a control command from a motor controller 2, the motor/generator MG is controlled through application of a three-phase alternating current that is generated by an inverter 3. This motor/generator MG acts as an electric motor that is driven and rotates by receiving power supply from a battery 4 (hereinafter, this state is called a power running state). Also, when the rotor receives rotational energy from the engine Eng or the driving wheels, the motor/generator MG serves as a generator that generates an electromotive force at both ends of the stator coil, and the motor/generator MG can also charge the battery 4 (hereinafter, this operating state is called a regenerative state). The rotor of this motor/generator MG is connected to a transmission input shaft of the automatic transmission AT through a damper.

The second clutch CL2 is a clutch that is interposed between the motor/generator MG and the rear left and right wheels RL, RR. Engagement and disengagement including slip-engagement and slip-disengagement, of this second clutch CL2, are controlled by a control pressure that is produced by a second clutch hydraulic unit 8 on the basis of a second clutch control command from an AT controller 7. As the second clutch CL2, for example, a wet multiple disc clutch or a wet multiple disc brake, which is capable of continuously controlling an oil flow amount and the oil pressure through a proportional solenoid, is used.

Here, the first clutch hydraulic unit 6 and the second clutch hydraulic unit 8 are built into an AT hydraulic control valve unit CVU that is provided in the automatic transmission AT.

The automatic transmission AT is a multi-range transmission that automatically changes a shift position of multi-speed (multistage) of forward 5 speeds and reverse 1 speed according to a vehicle speed and an accelerator opening and so on. Here, the second clutch CL2 is not a clutch that is newly added as a special clutch, but an optimum clutch or brake that is arranged on a torque transmission path, among a plurality of frictional engagement elements which are engaged in each speed or each shift stage in the automatic transmission AT, is selected as the second clutch CL2. As the second clutch CL2, as shown by a two-dot chain line in the drawing, a dedicated clutch could be interposed between the motor/generator MG and the automatic transmission AT or between the automatic transmission AT and the driving wheels (the rear left and right wheels RL, RR) without using the frictional engagement element of the automatic transmission AT.

An output shaft of this automatic transmission AT is connected to the rear left and rear right wheels RL, RR through the propeller shaft PS, the differential gear DF, the left drive shaft DSL and the right drive shaft DSR.

[Configuration of Control System]

Next, a control system of the hybrid vehicle will be explained.

As shown in FIG. 1, the control system of the hybrid vehicle has the engine controller 1, the motor controller 2, the inverter 3, the battery 4, the first clutch controller 5, the first clutch hydraulic unit 6, the AT controller 7, the second clutch hydraulic unit 8, a brake controller 9, and an integrated controller 10. Here, the engine controller 1, the motor controller 2, the first clutch controller 5, the AT controller 7, the brake controller 9 and the integrated controller 10 are connected with each other through a CAN communication line 11 that allows the exchange of information between them.

The engine controller 1 inputs engine rpm information from an engine rpm sensor 12 and a target engine torque command from the integrated controller 10, also inputs the other information. Then the engine controller 1 outputs a command that controls an engine operating point (Ne, Te) to a throttle valve actuator etc. of the engine Eng.

The motor controller 2 inputs information from a resolver 13 that detects a rotor rotational position of the motor/generator MG, a target MG torque command and a target MG rotation speed command from the integrated controller 10, also inputs the other information. Then the motor controller 2 outputs a command that controls a motor operating point (Nm, Tm) of the motor/generator MG to the inverter 3. In addition, the motor controller 2 measures or checks a battery SOC that indicates a capacity of charge of the battery 4. This battery SOC information is used for the control of the motor/generator MG, and also is sent to the integrated controller 10 through the CAN communication line 11.

The first clutch controller 5 inputs sensor information from a first clutch stroke sensor 15 that detects a stroke position of the piston 14a of the hydraulic actuator 14 and a target CL1 torque command from the integrated controller 10, also inputs the other information. Then the first clutch controller 5 outputs a command that controls the engagement/disengagement of the first clutch CL1 to the first clutch hydraulic unit 6 in the AT hydraulic control valve unit CVU.

The AT controller 7 inputs information from an accelerator opening sensor 16, a vehicle speed sensor 17 and other sensors 18 (such as a transmission input rotation speed sensor and an inhibitor switch). Then, during the travel with a D range selected, the AT controller 7 searches an optimum speed range (optimum speed stage) according to a position on a shift map, of the operating point determined by the accelerator opening APO and the vehicle speed VSP, and also outputs a control command that achieves the searched speed range to the AT hydraulic control valve unit CVU. In addition to the above automatic transmission control, when the AT controller 7 inputs a target CL2 torque command from the integrated controller 10, the AT controller 7 executes a second clutch control in which a command that controls the engagement/disengagement of the second clutch CL2 is outputted to the second clutch hydraulic unit 8 in the AT hydraulic control valve unit CVU.

Figure 8:
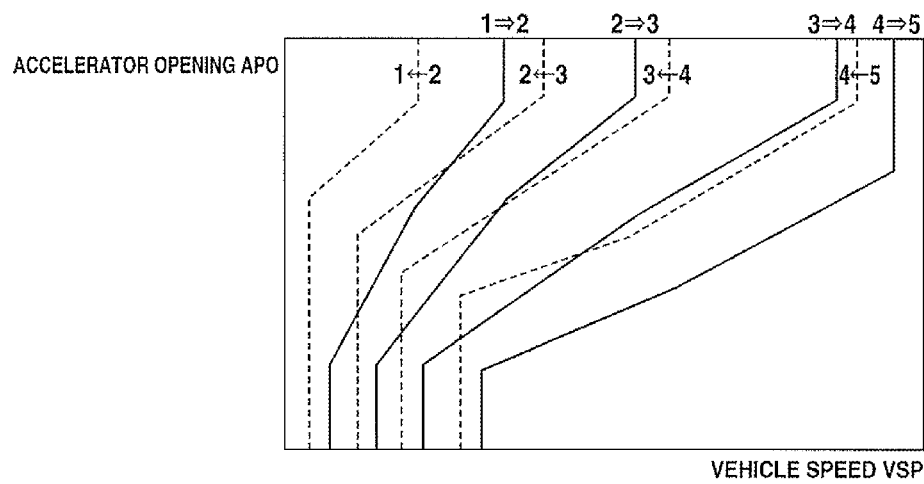
FIG. 8 is a drawing of a speed shift characteristic line by which a transmission ratio is set by an AT controller that performs a speed shift control of an automatic transmission that is applied to the driving torque control device for the hybrid vehicle of the embodiment 1.

Here, the shift map is a map where an up-shift line and a down-shift line are drawn according to the accelerator opening APO and the vehicle speed VSP. An example of the shift map is shown in FIG. 8.

The brake controller 9 inputs sensor information from a wheel speed sensor 19 for detecting each wheel speed of four wheels and a brake stroke sensor 20 and a regenerative coordination control command from the integrated controller 10, also inputs the other information. Then, for instance, in a case where the brake is applied by only a regenerative braking force upon a brake operation by brake pedal depression, when the braking force is lacking for a required braking force according to a brake stroke BS of the brake pedal depression, the brake controller 9 performs a regenerative coordination brake control so that the shortage of the braking force is compensated by a mechanical braking force (a hydraulic braking force or a motor braking force).

[Configuration of Integrated Controller]

The integrated controller 10 is a controller that controls a consumption energy of the whole vehicle, and performs the operation in order for the hybrid vehicle to travel at a maximum efficiency. The integrated controller 10 inputs information from a motor rotation speed sensor 21 that detects a motor rotation speed Nm and information from other sensors and switches 22 through the CAN communication line 11. Then the integrated controller 10 outputs the target engine torque command to the engine controller 1, outputs the target MG torque command and the target MG rotation speed command to the motor controller 2, outputs the target CL1 torque command to the first clutch controller 5, outputs the target CL2 torque command to the AT controller 7, and outputs the regenerative coordination control command to the brake controller 9.

Figure 2:
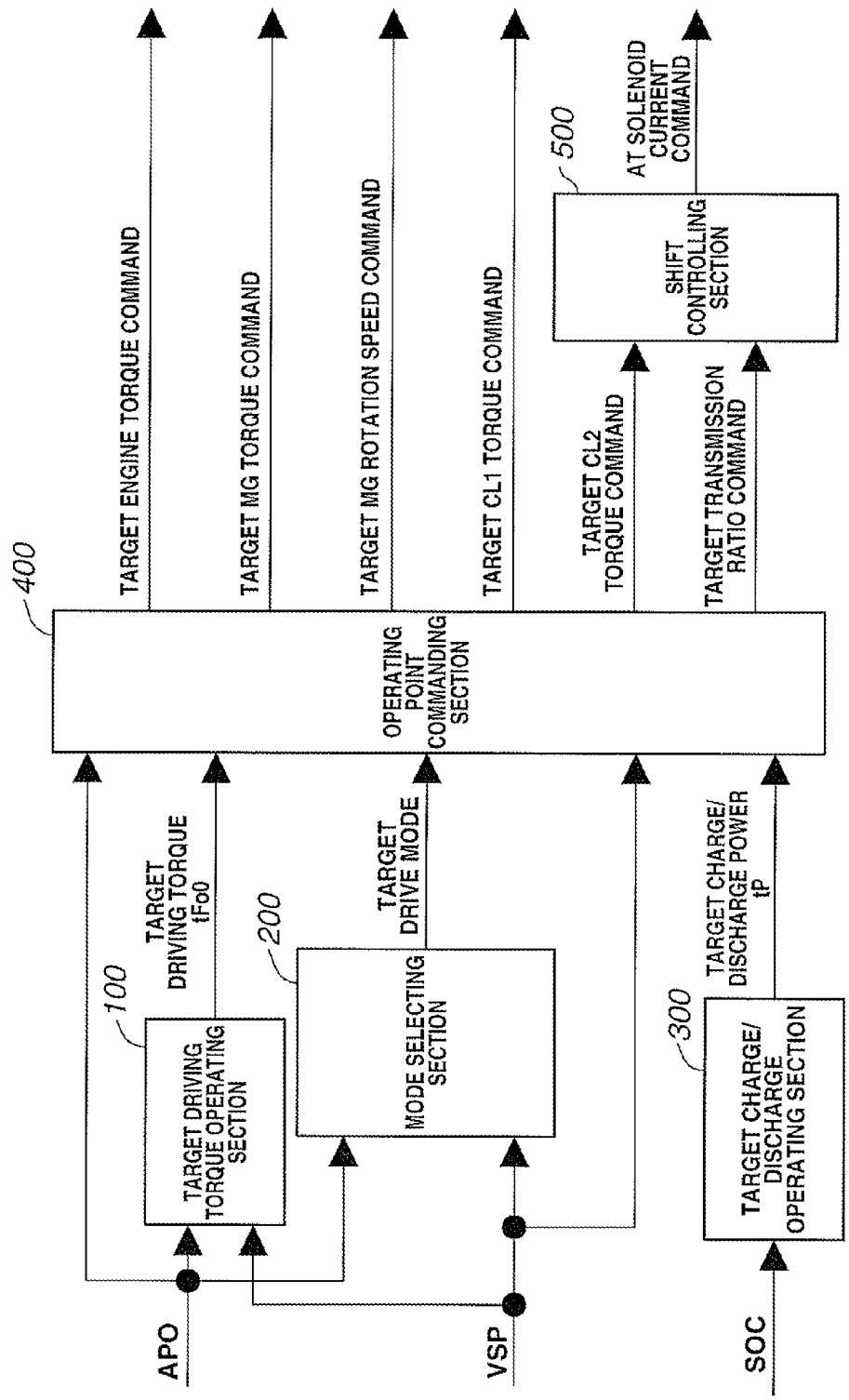
FIG. 2 is a control block diagram showing operation processes performed in an integrated controller of the hybrid vehicle to which the driving torque control device for the hybrid vehicle of the embodiment 1 is applied.

FIG. 2 is a control block diagram showing operation processes performed in the integrated controller 10 of the hybrid vehicle to which the driving torque control device for the hybrid vehicle of the embodiment 1 is applied. FIG. 3 is a drawing showing an EV-HEV selection map used when performing a mode selection process in the integrated controller 10 of the hybrid vehicle. In the following description, the operation process executed in the integrated controller 10 will be explained with reference to FIGS. 2 and 3.

As shown in FIG. 2, the integrated controller 10 has a target driving torque operating section 100, a mode selecting section 200, a target charge/discharge operating section 300, and an operating point commanding section 400.

Figure 4A:
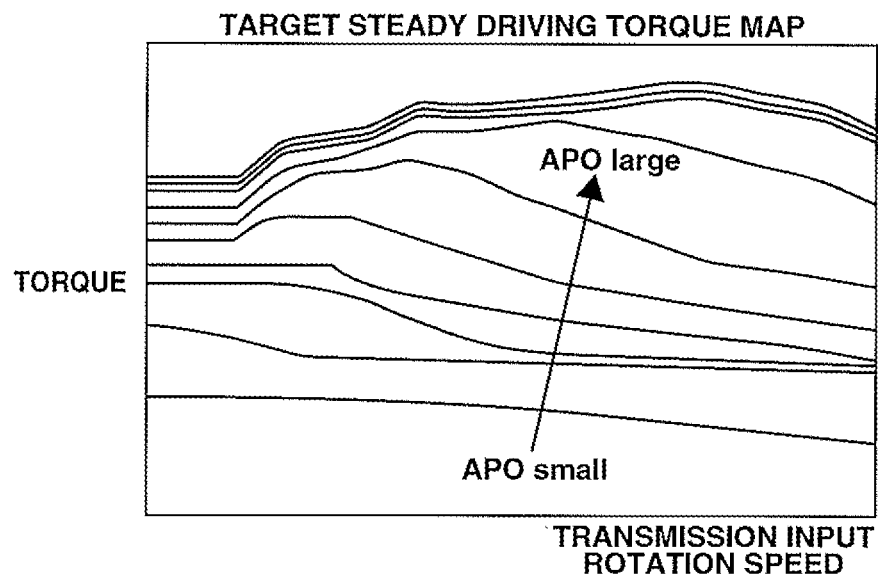
FIG. 4A is a driving force characteristic line map, which shows a target steady driving torque characteristic, used when a target driving torque operating section determines a target driving torque in the driving torque control device for the hybrid vehicle of the embodiment 1.
Figure 4B:
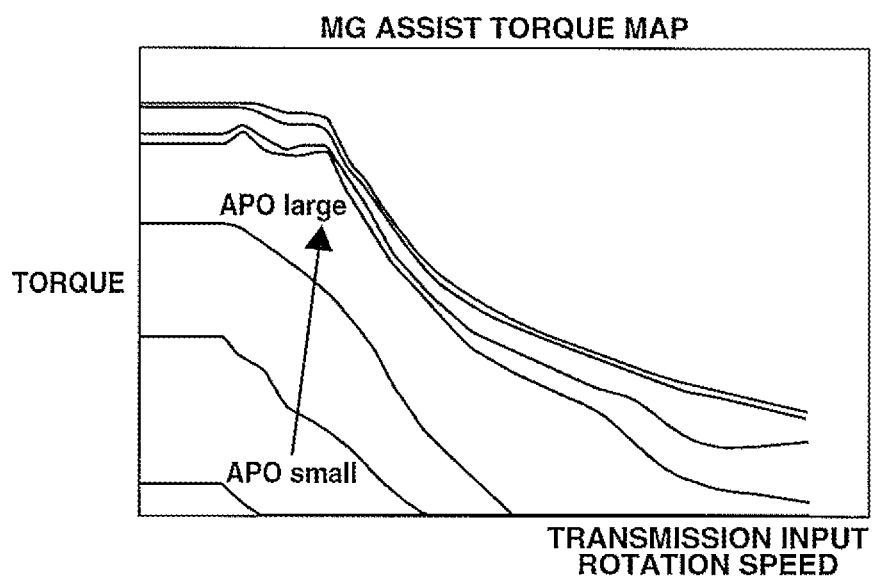
FIG. 4B is an assist torque map, which shows an MG assist torque characteristic, used when the target driving torque operating section determines an assist torque of a motor/generator in the driving torque control device for the hybrid vehicle of the embodiment 1.

The target driving torque operating section 100 calculates a target steady driving torque and an MG assist torque from a transmission input rotation speed according to the accelerator opening APO and the vehicle speed VSP using a target steady driving torque map shown in FIG. 4A and an MG assist torque map shown in FIG. 4B.

The mode selecting section 200 selects an EV travel mode or a HEV travel mode as a target travel mode using an engine start stop line map that is set according to the accelerator opening APO set for each vehicle speed as shown in FIG. 5. Here, the engine start line and the engine stop line are set so as to lower to a direction in which the accelerator opening becomes small as the battery SOC becomes low.

Figure 7:
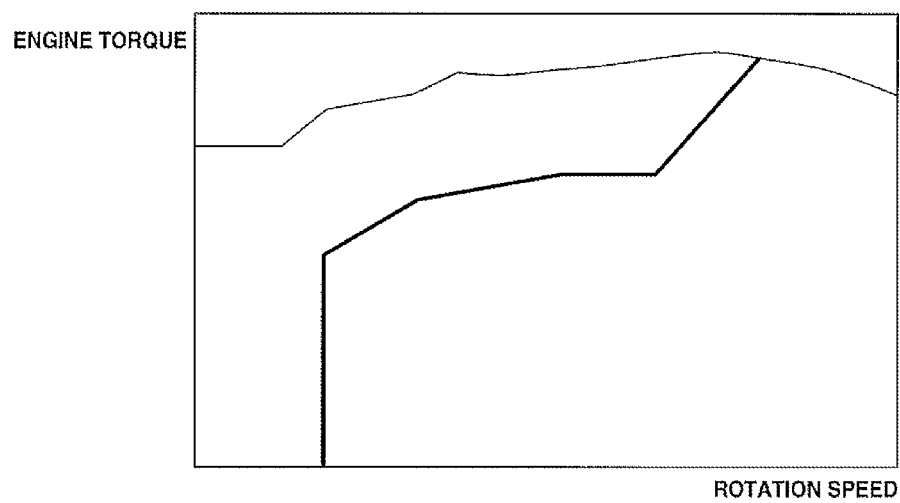
FIG. 7 is an explanatory drawing of progress of an engine torque increase, which shows progress of the engine torque increasing to a maximum fuel efficiency line according to a vehicle speed, of the driving torque control device for the hybrid vehicle of the embodiment 1.

The target charge/discharge operating section 300 calculates a target power generation output on the basis of the battery SOC using a travelling power generation required output map shown in FIG. 6. Further, the target charge/discharge operating section 300 calculates an output required for an engine torque to rise from a current operating point to a maximum fuel efficiency line as shown by a thick line in FIG. 7, and compares it with the target power generation output, then adds, as a required output, a smaller output to an engine output.

The operating point commanding section 400 calculates a transient target engine torque, a transient target MG torque, a transient target MG rotation speed, a transient target CL1 torque, a transient target CL2 torque and a transient target transmission ratio from the accelerator opening APO, a target driving torque tFo0 the MG assist torque, a target mode, the vehicle speed VSP and a target charge/discharge power (the required power generation output) tP with these being operating point targets to reach. These calculation results are outputted to the controllers 1, 2, 5 and 7 respectively through the CAN communication line 11.

Further, the operating point commanding section 400 executes an engine start operation.

That is, when the operating point determined by combination between the accelerator opening APO and the vehicle speed VSP enters a HEV area across an EV→HEV change line during an EV travel, the mode selecting section 200 changes the mode from the EV travel mode to the HEV travel mode that includes the engine start. Also, when the operating point enters an EV area across a HEV→EV change line during a HEV travel, the mode selecting section 200 changes the mode from the HEV travel mode to the EV travel mode that includes the engine stop and engine cut-off (or engine isolation).

In response to this travel mode change, the operating point commanding section 400 executes the engine start operation at a time when the accelerator opening APO crosses the engine start line shown in FIG. 5 during the travel in the EV mode. With regard to this engine start operation, a torque capacity of the second clutch CL2 is controlled so that the second clutch CL2 slips in the half clutch state or the partial clutch engagement state, and after judging that the slip of the second clutch CL2 starts, engagement of the first clutch CL1 is started, then an engine rotation speed is increased. Further, when the engine rotation speed reaches a rotation speed that allows an initial explosion, the engine Eng is brought into an engine working state, and at a timing at which the motor rotation speed and the engine rotation speed are close to each other, the first clutch CL1 is fully engaged. After that, the second clutch CL2 is locked up, and the mode is shifted to the HEV travel mode.

A shift controlling section 500 controls drive of a solenoid valve in the automatic transmission AT from the target CL2 torque capacity and the target transmission ratio so as to achieve these targets. FIG. 8 shows speed shift lines. That is, on the basis of the vehicle speed VSP and the accelerator opening APO, the shift controlling section 500 judges next shift position from a current shift position, and if a demand for speed shift (shift position change) is made, the shift controlling section 500 carries out the speed shift by controlling the shift clutch.

Figure 9:
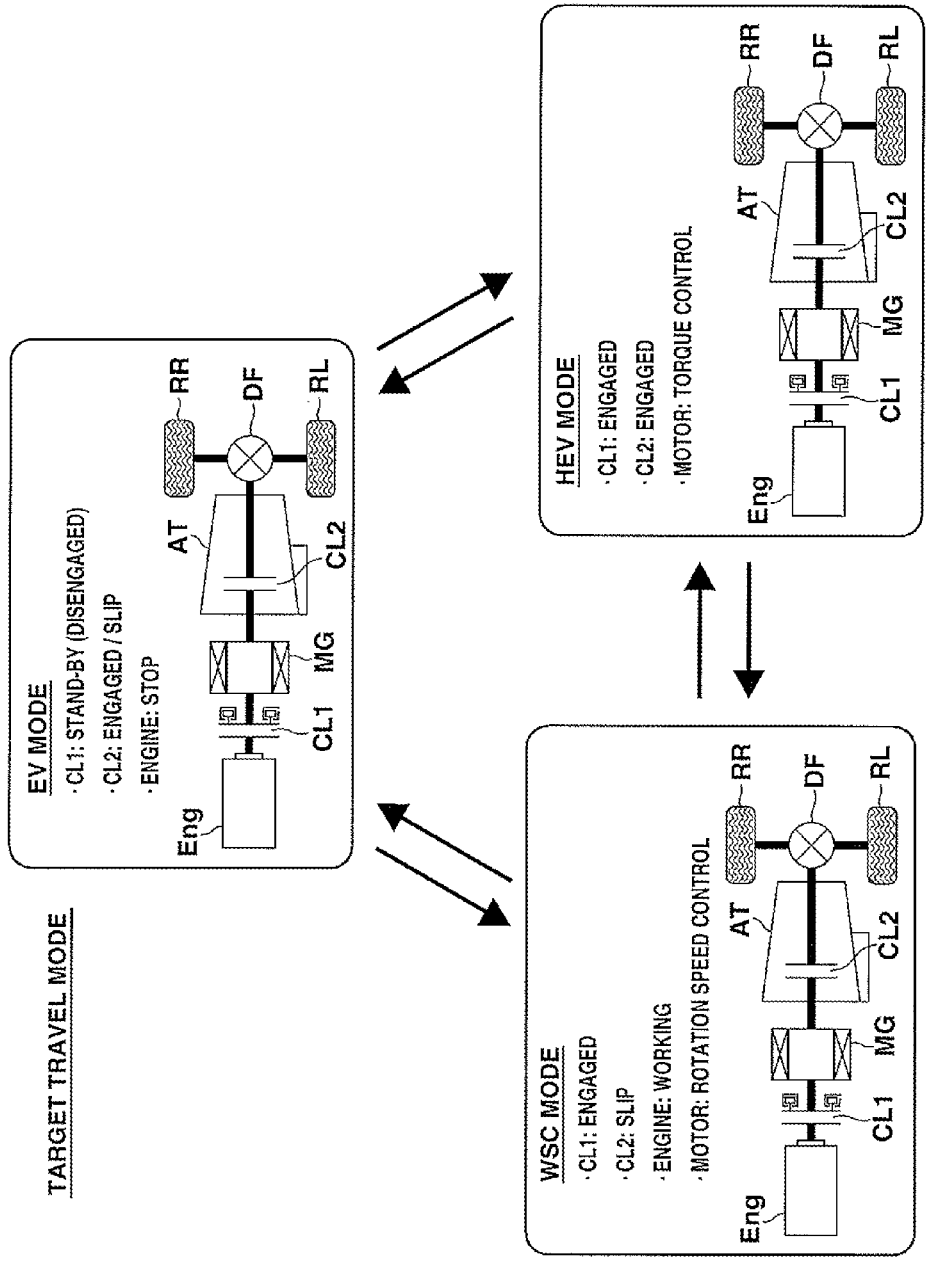
FIG. 9 is a drawing of a target travel mode showing an example of a target travel mode shift, of the control device for the hybrid vehicle of the embodiment 1.

The integrated controller 10 having the above configurations sets, as the travel mode as shown in FIG. 9, in addition to the EV mode and HEV mode, a WSC mode that is set in a mode change transition between these EV and HEV travel modes.

EV mode is a mode in which the vehicle travels by only power of the motor/generator MG. In this EV mode, the engine Eng is held in an engine stop state, and the first clutch CL1 is disengaged, then by the engagement or the slip-engagement of the second clutch CL2, only output rotation from the motor/generator MG is transmitted to the rear left and right wheels RL, RR through the automatic transmission AT.

HEV mode is a mode in which the vehicle travels by power of the engine Eng and the motor/generator MG. In this HEV mode, each of the second clutch CL2 and the first clutch CL1 is engaged, and output rotation from the engine Eng and output rotation from the motor/generator MG are transmitted to the rear left and right wheels RL, RR through the automatic transmission AT.

WSC mode is a mode in which, at a vehicle start from HEV mode with D position selected from P or N position or at a vehicle start with D position from EV mode or HEV mode, the vehicle starts while controlling the clutch torque capacity. In this case, the slip-engagement state of the second clutch CL2 is maintained by the rotation speed control of the motor/generator MG, and the vehicle starts while controlling the clutch torque capacity so that a clutch transmission torque transmitted through the second clutch CL2 is a required driving torque determined in accordance with a vehicle condition and driver's operation. At this time, since the second clutch CL2 is in the slip-engagement state, mode change shock is absorbed, which can take measures to suppress the shock. Here, "WSC" stands for Wet Start Clutch.

[Configuration of Engine Start Control Process]

Figure 10:
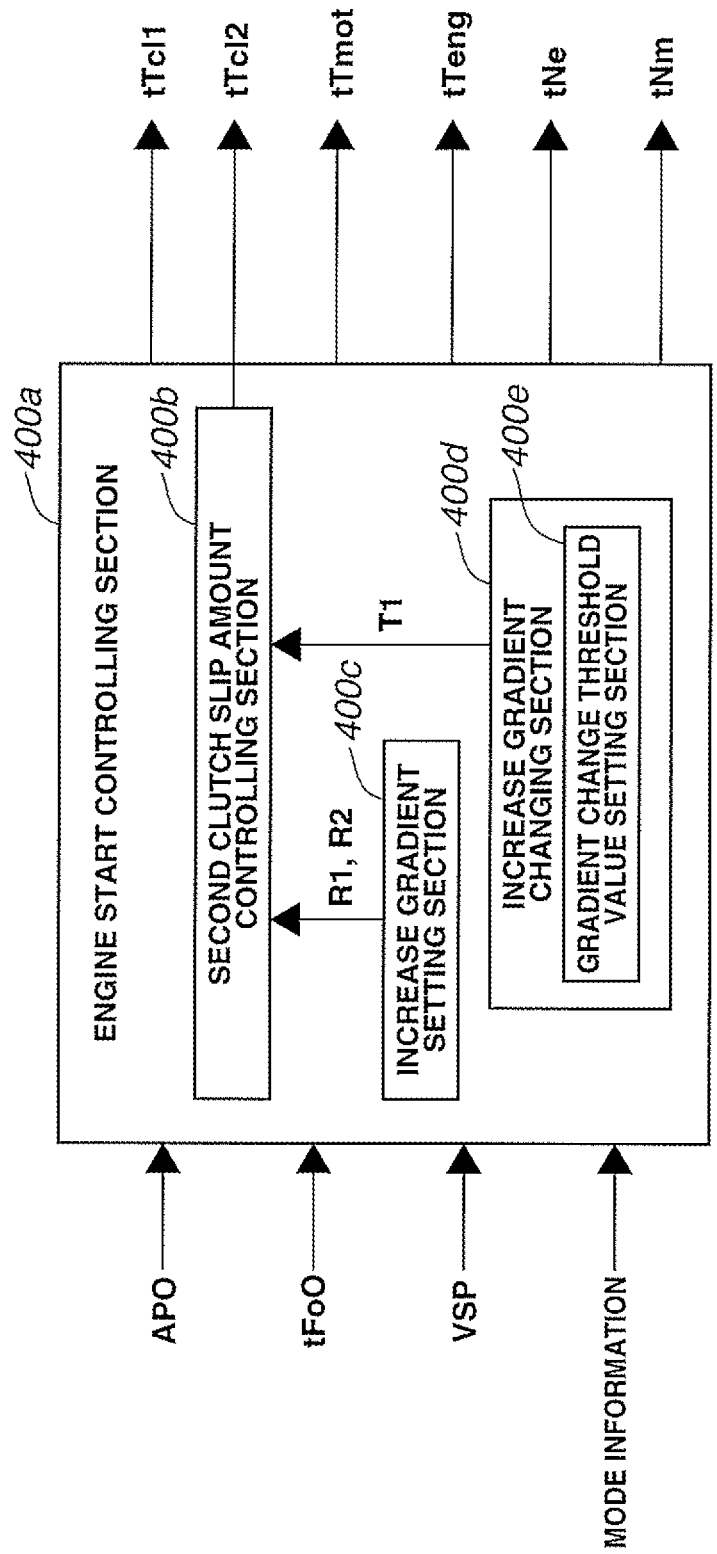
FIG. 10 is a block diagram showing a main part of the integrated controller of the control device for the hybrid vehicle of the embodiment 1.

FIG. 10 shows a configuration of a part in the operating point commanding section 400, which executes the engine start control. An engine start controlling section 400a that executes this engine start control has a second clutch slip amount controlling section 400b, an increase gradient setting section 400c, an increase gradient changing section 400d and a gradient change threshold value setting section 400e.

FIG. 11 shows a flow of the engine start control process executed by the engine start controlling section 400a of the integrated controller 10 before the mode is shifted from EV mode to HEV mode as described above.

This engine start control is started at a time point when the accelerator opening APO and the vehicle speed VSP cross the engine start line shown in FIG. 5 as mentioned above.

At a first step S101, after a command torque of the second clutch CL2 is decreased to a slip control value Tslip by the second clutch slip amount controlling section 400b, the command torque of the second clutch CL2 is increased at a slip-in increase gradient R01 (see FIG. 13), and the second clutch CL2 is controlled toward the slip state. In addition, in parallel with this control, a motor torque Tmot that is an output torque of the motor/generator MG is increased more than the target driving torque (the target steady driving torque) tFo0, then the routine proceeds to next step S102.

Here, the slip control value Tslip is set according to the accelerator opening APO or the target driving torque tFo0 so that the smaller the both values APO and tFo0, the smaller the slip control value Tslip is set so that the slip easily occurs. That is, an amount of drop of the slip control value is set to be large. Further, the slip-in increase gradient R01 is set according to the accelerator opening APO or the target driving torque tFo0 so that the smaller the both values APO and tFo0, the gentler the gradient.

At the next step S102, a judgement of the slip of the second clutch CL2 is made. If no slip occurs, the routine returns to step S101. If the slip occurs, the routine proceeds to step S103. Here, this judgement of the slip state is made on the basis of a difference between the motor rotation speed Nm and an output rotation speed of the automatic transmission AT×a gear ratio Nout.

At step S103 to which the routine proceeds when the second clutch CL2 slips, a first clutch transmission capacity command value tTcl1 as a transmission torque capacity of the first clutch CL1 is increased to a cranking torque Tcr that is previously set for engine start torque transmission from the motor/generator MG to the engine Eng, then the routine proceeds to step S104.

The cranking torque Tcr is a value that is within a range indicated by the next expression, in order to maintain an increase of the driving force and a stable slip of the second clutch CL2.

$$Tcl1_{min} < Tcr < Tm_{max} - tTcl2 = Tm_{max} - tTi$$

Here, $Tcl1_{min}$ is set to an engine friction value if the engine is not ignited yet (i.e. before engine ignition), and is set to zero if the engine is already ignited (i.e. after the engine ignition). $Tm_{max}$ is a maximum torque of the motor/generator MG. $tTcl2$ is a transmission torque capacity of the second clutch CL2. $tTi$ is a target transmission input torque, and is the target driving torque tFo0.

At step S104, the second clutch transmission torque capacity command value tTcl2 as the transmission torque capacity of the second clutch CL2 is increased at a constant setting increase gradient Rp by the second clutch slip amount controlling section 400b, then the routine proceeds to step S105. Here, the increase gradient Rp is, for instance, a value that is proportional to the target driving torque tFo0.

At step S105, a judgment is made as to whether or not the second clutch transmission torque capacity command value tTcl2 as the transmission torque capacity of the second clutch CL2 is equal to or greater than a cranking torque limit value Tcrlim. If the second clutch transmission torque capacity command value tTcl2 is less than the cranking torque limit value Tcrlim, the routine repeats processes from step S103. If the second clutch transmission torque capacity command value tTcl2 is equal to or greater than the cranking torque limit value Tcrlim, the routine proceeds to step S106.

At step S106, the second clutch slip amount controlling section 400b limits the second clutch transmission torque capacity command value tTcl2 to the cranking torque limit value Tcrlim, then the routine proceeds to step S107.

Here, the cranking torque limit value Tcrlim is a value to maintain the slip state of the second clutch CL2 until the engine rotation speed reaches a target rotation speed during the engine cranking, and is determined by the following operation expression (1).

$$T\text{crlim} = T\text{mot}_{max} - t\text{cl}1 - \text{clutch variation amount} \quad (1)$$

Here, $T\text{mot}_{max}$ is a motor torque upper limit value. tcl1 is a torque capacity command value of the first clutch CL1. The clutch variation amount is a torque variation amount of the both clutches CL1 and CL2.

At step S107 to which the routine proceeds after executing the process of step S106, a judgment is made as to whether or not a slip rotation amount of the first clutch CL1 is equal to or smaller than a convergence judgment threshold value. If the slip rotation amount of the first clutch CL1 is greater than the convergence judgment threshold value, the routine repeats processes from step S106. If the slip rotation amount of the first clutch CL1 is equal to or smaller than the convergence judgment threshold value, the routine proceeds to step S108. This step S107 is a step that judges whether a lock-up condition of the second clutch CL2 is satisfied or not. In a case of "YES" judgment, a full engagement operation of the second clutch CL2 by processes at step S109 and S111 is performed.

Here, the convergence judgment threshold value is a value for judging that complete explosion of the engine Eng is attained, and is a value that indicates that a difference between the engine rotation speed Ne and an output rotation speed of the automatic transmission AT×a gear ratio Nout becomes less than a setting value and both rotation speeds become an almost same rotation speed.

At step S108 to which the routine proceeds after "YES" is judged at step S107, the first clutch transmission torque capacity command value tTcl1 as a first clutch torque is increased to a value equivalent to the full engagement, then the routine proceeds to step S109.

At step S109, the second clutch transmission torque capacity command value tTcl2 is increased toward the target driving torque tFo0 at a first increase gradient R1 by the second clutch slip amount controlling section 400b, then the routine proceeds to step S110.

At the next step S110, a judgment is made as to whether or not the second clutch transmission torque capacity command value tTcl2 is equal to or greater than a gradient change threshold value T1. If the second clutch transmission torque capacity command value tTcl2 is equal to or greater than the gradient change threshold value T1, the routine proceeds to step S111. If the second clutch transmission torque capacity command value tTcl2 is not equal to or greater than the gradient change threshold value T1, the routine returns to the process from step S109.

At step S111 to which the routine proceeds when the second clutch transmission torque capacity command value tTcl2 is equal to or greater than the gradient change threshold value T1, the second clutch transmission torque capacity command value tTcl2 is increased to the target driving torque tFo0 at a second increase gradient R2, then the engine start control is ended. That is, the processes from step S109 to step S111 are executed by the increase gradient changing section 400d, and the increase gradient is changed from the first increase gradient R1 to the second increase gradient R2.

Explanation of the first increase gradient R1 used at step S109, the gradient change threshold value T1 used at step S110 and the second increase gradient R2 used at step S111 will be added here.

Figure 12A:
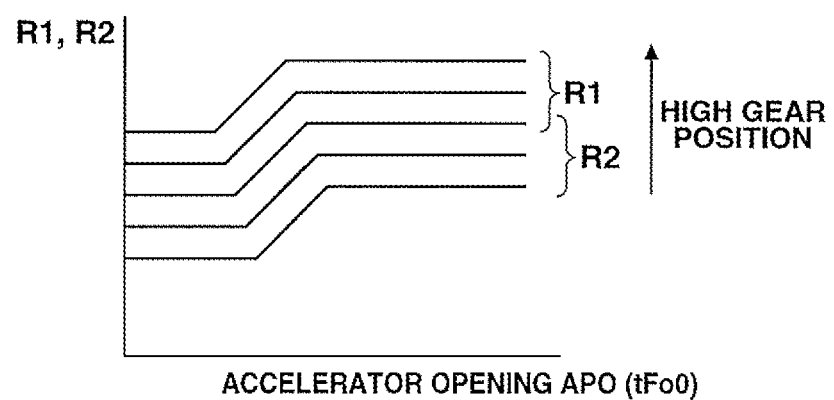
FIG. 12A shows an increase gradient setting map used for setting of a first increase gradient and a second increase gradient, of the control device for the hybrid vehicle of the embodiment 1.

These first increase gradient R1 and second increase gradient R2 are set on the basis of an increase gradient setting map shown in FIG. 12A by the increase gradient setting section 400c (see FIG. 10).

That is, each of the first increase gradient R1 and the second increase gradient R2 is set according to an acceleration operation, more specifically, according to the accelerator opening APO or the target driving torque tFo0 so that the smaller the APO and the tFo0, the smaller the both gradients. Further, the first increase gradient R1 is set to be steeper than the second increase gradient R2. Furthermore, each of the first increase gradient R1 and the second increase gradient R2 is set according to the gear position of the automatic transmission AT so that as the gear position becomes higher, a value of each gradient becomes greater.

The first increase gradient R1 is set with main consideration given to acceleration performance in order to obtain a desired acceleration feeling. On the other hand, the second increase gradient R2 is set with the aim of suppressing an occurrence of the engagement shock. The second increase gradient R2 is set so as to be able to suppress the engagement shock to a predetermined shock or smaller at a time (at t7 in FIG. 13) when the second clutch transmission torque capacity command value tTcl2 reaches the target driving torque tFo0.

Figure 12B:
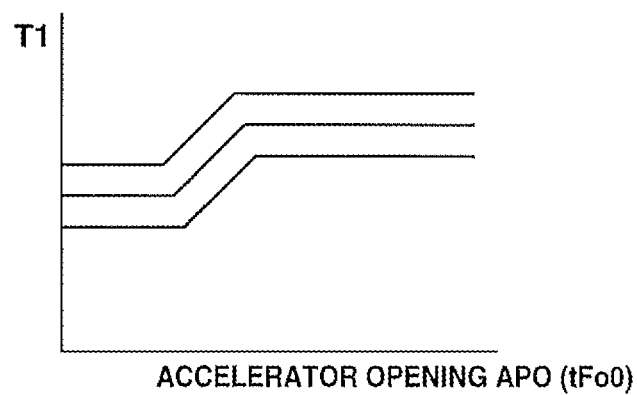
FIG. 12B shows a gradient change threshold value setting map used for setting of a gradient change threshold value, of the control device for the hybrid vehicle of the embodiment 1.

The gradient change threshold value T1 is set on the basis of a gradient change threshold value setting map shown in FIG. 12B by the gradient change threshold value setting section 400e (see FIG. 10). That is, also the gradient change threshold value T1 is set according to the acceleration operation, more specifically, according to the accelerator opening APO or the target driving torque tFo0 so that the smaller the APO and the tFo0, the smaller the gradient change threshold value. Furthermore, also the gradient change threshold value T1 is set according to the gear position of the automatic transmission AT so that as the gear position becomes higher, the gradient change threshold value becomes greater.

Working and Operation of Embodiment 1

Next, working and operation of the embodiment 1 will be explained on the basis of an example of operation shown in a time chart in FIG. 13.

This example of the operation is a case where the mode is changed to HEV mode from a coasting state (a coasting travel state) in EV mode by performing driver's acceleration operation by depressing an accelerator pedal.

At a time point t0 in FIG. 13, as mentioned above, the vehicle is in the coasting state in which the accelerator opening is 0 in EV mode, and the second clutch CL2 is being controlled to the engagement state.

From this state, the depression of the accelerator pedal is started at a time point t1, and the accelerator opening APO rises. After that, in the vicinity of a time point t3, the accelerator opening APO is maintained constant. Further, in response to this operation, also the target driving torque tFo0 is increased from the time point t1 as shown by a dotted line in the drawing, and is constant after a time point close to t6.

When a driver performs such an acceleration operation, at a time point t2 in the drawing, the accelerator opening APO and the vehicle speed VSP cross the engine start line, then an engine start judgment is made. By this engine start judgment, the engine start control shown by the flow chart in FIG. 11 is carried out.

First, after decreasing the second clutch transmission torque capacity command value tTcl2 to the slip control value Tslip, the second clutch transmission torque capacity command value tTcl2 is increased at the slip-in increase gradient R01. In addition, at the same time, the motor torque Tmot is increased more than the target driving torque tFo0 (step S101).

Then, at the time point t3 at which the motor rotation speed Nm is greater, by a predetermined value or more, than the rotation speed (the output rotation speed×the gear ratio) Nout of the automatic transmission AT side, it is judged that the slip of the second clutch CL2 occurs (step S102). With this, by increasing the first clutch transmission capacity command value tTcl1 to the cranking torque Tcr, the slip-engagement of the first clutch CL1 is started. At the same time, the second clutch transmission torque capacity command value tTcl2 is increased at the increase gradient Rp that is an almost same gradient as an increase gradient of the target driving torque tFo0, and a driving force transmitted to the driving wheel side is increased (the processes from S103→S104).

Thus, while starting to input the cranking torque to the engine Eng, the driving torque of the motor/generator MG which is transmitted to the rear left and right wheels RL, RR of the driving wheels is increased, then the vehicle is accelerated.

Further, from the time point t3 at which the cranking of the engine Eng starts by the input of the rotation through the first clutch CL1, the control is shifted to the rotation speed control of the motor/generator MG.

Afterwards, the second clutch transmission torque capacity command value tTcl2 is limited to the cranking torque limit value Tcrlim from a time point (a time point t4) at which the tTcl2 reaches the cranking torque limit value Tcrlim, and the second clutch CL2 is maintained at the slip state. This slip state of the second clutch CL2 by the limit of the cranking torque limit value Tcrlim is maintained until the slip of the first clutch CL1 converges and a slip rotation difference reaches the convergence judgment threshold value (until a time point t5).

Subsequently, at a time point (at the time point t5) at which the engine rotation speed Ne increases and gets closer to the motor rotation speed Nm and the slip rotation amount of the first clutch CL1 is equal to or smaller than the convergence judgment threshold value, it is judged that the complete explosion of the engine Eng is attained, then both clutch full engagement operation is executed. That is, while increasing the first clutch transmission torque capacity command value tTcl1 to the value equivalent to the full engagement, the second clutch transmission torque capacity command value tTcl2 is also controlled so as to increase toward the target driving torque tFo0 for the full engagement of the second clutch CL2.

Here, an example of the operation of a comparative example when executing the full engagement operation of the second clutch CL2 which controls the second clutch transmission torque capacity command value tTcl2 toward the target driving torque tFo0 will be explained.

In FIG. 13, an example of the increase gradient of a second clutch transmission torque capacity command value tTcl2 of the comparative example is shown by a dotted line and a chain line (an alternate long and short dash line) that increase from the time point t5.

In the related art technique, like this comparative example, the second clutch transmission torque capacity command value tTcl2 is increased toward the target driving torque tFo0 at a constant increase gradient. This increase gradient of the comparative example shown by the dotted line is a gradient that is set to give the driver the acceleration feeling. In a case where the second clutch transmission torque capacity command value tTcl2 is increased to the target driving torque tFo0 at this increase gradient of the comparative example shown by the dotted line, a rotation difference of the second clutch CL2 rapidly converges at a time point t6b at which the second clutch CL2 is fully engaged.

For this reason, the engine rotation speed Ne is pulled to (or dragged into) a driving wheel speed side as shown by a dotted line, and pull-in shock occurs in a vehicle back-and-forth acceleration G as shown by a dotted line.

On the other hand, in order to suppress such an occurrence of the pull-in shock, in a case where the increase gradient of the comparative example is set to be gentle as shown by the chain line (the alternate long and short dash line) in the drawing, it takes a long time from the time point t5 up to a time point t7b at which the tTcl2 reaches the target driving torque tFo0 and the second clutch CL2 is brought into the full engagement state, then this is slow in accelerating the vehicle.

In contrast to this, in the present embodiment 1, first the second clutch transmission torque capacity command value tTcl2 is increased from the time point t5 at the first increase gradient R1 that is set with main consideration given to the acceleration performance (S109). Then, when the second clutch transmission torque capacity command value tTcl2 reaches the gradient change threshold value T1, the second clutch transmission torque capacity command value tTcl2 is increased toward the target driving torque tFo0 at the second increase gradient R2 that is gentler than the first increase gradient R1 and is set with main consideration given to the suppression of the shock (S110→S111).

Accordingly, first, by increasing the second clutch transmission torque capacity command value tTcl2 at the first increase gradient R1, a timing (a time point t7) of the full engagement can be advanced as compared with the timing (t7b) of the comparative example shown by the chain line (the alternate long and short dash line) that is set to be gentle, then the acceleration feeling can be secured.

In addition, at the full engagement of the second clutch CL2, as compared with the full engagement of the second clutch CL2 of the comparative example shown by the dotted line set to be steep, an input output rotation difference convergence change of the second clutch CL2 is set to be gentle, then the occurrence of the pull-in shock can be suppressed.

Effect of Embodiment 1

Effect of the embodiment 1 will be described below. a) A control device for a hybrid vehicle of the embodiment 1 has an engine Eng and a motor/generator MG as drive sources; a first clutch CL1 which is provided between the engine Eng and the motor/generator MG and whose transmission torque capacity is variable; a second clutch CL2 provided between the motor/generator MG and driving wheels (rear-left and right wheels RL, RR) and whose transmission torque capacity is variable; and a second clutch slip amount controlling section 400b performing a full engagement operation that shifts the second clutch CL2 from a slip state to a full engagement state at a time when a predetermined lock-up condition of the second clutch CL2 is satisfied in the slip state of the second clutch CL2. And when the second clutch CL2 is shifted from the slip state toward the full engagement state in the full engagement operation, the second clutch slip amount controlling section 400b first increases a transmission torque capacity of the second clutch CL2 at a first increase gradient R1 (S109) and subsequently increases the transmission torque capacity of the second clutch CL2 at a second increase gradient R2 that is gentler than the first increase gradient R1 (S111).

Therefore, since the transmission torque capacity of the second clutch CL2 is increased at the second increase gradient R2 immediately before the full engagement, it is possible to suppress the shock at the time of the full engagement of the second clutch CL2. In particular, a shock occurring when the slip state of the second clutch CL2 rapidly converges due to lack of an engine torque Te can be suppressed.

On the other hand, since the transmission torque capacity of the second clutch CL2 is increased at the first increase gradient R1 in early stage of a torque increase from the slip state toward the full engagement of the second clutch CL2, high acceleration performance can be ensured.

In this manner, in the embodiment 1, it is possible to provide the control device for the hybrid vehicle which is capable of ensuring the acceleration performance while suppressing the engagement shock of the second clutch CL2 when shifting the second clutch CL2 from the slip state to the full engagement state.

b) In the control device for the hybrid vehicle of the embodiment 1, the second clutch slip amount controlling section 400b has an increase gradient setting section 400c that sets the first increase gradient R1 and the second increase gradient R2, and the increase gradient setting section 400c sets each of the first increase gradient R1 and the second increase gradient R2 according to the accelerator opening APO or the target driving torque tFo0 as the acceleration operation.

In this manner, by setting each of the first increase gradient R1 and the second increase gradient R2 according to the accelerator opening APO or the target driving torque tFo0, it is possible to set each of the first and second increase gradients R1, R2 to a gradient according to the driver's acceleration operation, and obtain the acceleration feeling according to the acceleration operation.

More specifically, as described in the embodiment 1, by setting each of the first and second increase gradients R1, R2 so that the greater the accelerator opening APO and the target driving torque tFo0, the steeper the both gradients R1, R2, high acceleration feeling can be secured.

c) In the control device for the hybrid vehicle of the embodiment 1, an automatic transmission AT is interposed between the motor/generator MG and driving wheels (rear-left and right wheels RL, RR), the second clutch slip amount controlling section 400b has an increase gradient setting section 400c that sets the first increase gradient R1 and the second increase gradient R2, and the increase gradient setting section 400c sets each of the first increase gradient R1 and the second increase gradient R2 according to the gear position of the automatic transmission AT.

Even if an input torque of the automatic transmission AT is same, the acceleration feeling is different depending on the gear position. That is, the acceleration feeling obtained in response to the acceleration operation in a high gear position is lower than that in a low gear position.

Thus, by setting each of the first increase gradient R1 and the second increase gradient R2 according to the gear position, it is possible to secure the high acceleration feeling in each gear position as compared with a case where each of the first and second increase gradients is set to be constant irrespective of the gear position. More specifically, as described in the embodiment 1, by setting each of the first increase gradient R1 and the second increase gradient R2 so that as the gear position becomes higher, each of the first increase gradient R1 and the second increase gradient R2 is set to be steeper, the high acceleration feeling can be secured in each gear position.

d) In the control device for the hybrid vehicle of the embodiment 1, the second clutch slip amount controlling section 400b has an increase gradient changing section 400d that changes an increase gradient from the first increase gradient R1 to the second increase gradient R2, and the increase gradient changing section 400d executes the increase gradient change from the first increase gradient R1 to the second increase gradient R2 at a time when the transmission torque capacity of the second clutch CL2 reaches a predetermined gradient change threshold value T1, and the increase gradient changing section 400d has a gradient change threshold value setting section 400e that sets the gradient change threshold value T1 according to the accelerator opening APO or the target driving torque tFo0 based on the acceleration operation.

It is therefore possible to adjust, on the basis of the setting of the gradient change threshold value T1, distribution or allocation of the first increase gradient R1 and the second increase gradient R2 when increasing the transmission torque capacity of the second clutch CL2 from the slip state toward the full engagement state.

For instance, if the allocation of the first increase gradient is set to be large, the acceleration feeling becomes higher. If the allocation of the second increase gradient R2 is set to be large, the engagement shock is suppressed more surely.

Thus, in the embodiment 1, by setting the gradient change threshold value T1 according to the driver's acceleration operation, more specifically, according to the accelerator opening APO or the target driving torque tFo0, the allocation of the first increase gradient R1 and the second increase gradient R2 can be set according to the driver's acceleration operation.

More specifically, by setting the gradient change threshold value T1 so that as the accelerator opening APO and the target driving torque tFo0 are greater, the gradient change threshold value T1 is relatively greater, the allocation of the first increase gradient R1 becomes large, then the high acceleration feeling can be secured. On the other hand, by setting the gradient change threshold value T1 so that as the accelerator opening APO is smaller, the gradient change threshold value T1 is relatively smaller, the allocation of the second increase gradient R2 becomes large, then the engagement shock can be suppressed more surely.

e) In the control device for the hybrid vehicle of the embodiment 1, an automatic transmission AT is interposed between the motor/generator MG and driving wheels (rear-left and right wheels RL, RR), the second clutch slip amount controlling section 400*b* has an increase gradient changing section 400*d* that changes an increase gradient from the first increase gradient R1 to the second increase gradient R2, and the increase gradient changing section 400*d* executes the increase gradient change from the first increase gradient R1 to the second increase gradient R2 at a time when a second clutch transmission torque capacity command value tTcl2 as a transmission torque capacity of the second clutch CL2 reaches a gradient change threshold value T1, and sets the gradient change threshold value T1 according to the gear position of the automatic transmission AT.

It is therefore possible to adjust, on the basis of the setting of the gradient change threshold value T1, distribution or allocation of the first increase gradient R1 and the second increase gradient R2 when increasing the transmission torque capacity of the second clutch CL2 from the slip state toward the full engagement state.

For instance, if the allocation of the first increase gradient is set to be large, the acceleration feeling becomes higher. If the allocation of the second increase gradient R2 is set to be large, the engagement shock is suppressed more surely.

Regarding the automatic transmission AT, as the gear position is lower, the acceleration feeling can be secured by a smaller torque increase. In contrast, as the gear position is higher, a larger torque increase is required to secure the acceleration feeling. On the other hand, regarding the automatic transmission AT, as the gear position is lower, the shock at the engagement of the second clutch CL2 occurs more easily. In contrast, as the gear position is higher, the shock at the engagement of the second clutch CL2 is harder to occur.

Thus, in the embodiment 1, by setting the gradient change threshold value T1 according to the gear position of the automatic transmission AT, the allocation of the first increase gradient R1 and the second increase gradient R2 can be set to an allocation suitable to secure the acceleration feeling.

More specifically, by setting the gradient change threshold value T1 so that as the gear position is higher, the gradient change threshold value T1 is relatively greater, the allocation of the first increase gradient R1 becomes large, then the high acceleration feeling can be secured. On the other hand, by setting the gradient change threshold value T1 so that as the gear position is lower, the gradient change threshold value T1 is relatively smaller, the allocation of the second increase gradient R2 becomes large, then the engagement shock can be suppressed more surely.

f) The control device for a hybrid vehicle of the embodiment 1 further has an engine start controlling section 400*a* that starts the engine Eng by performing a second clutch slip operation that increases a driving torque of the motor/generator MG while slipping the second clutch CL2 from an EV mode in which while the first clutch CL1 is disengaged, the second clutch CL2 is engaged and the motor/generator MG is driven, a cranking operation that transmits rotation of the motor/generator MG to the engine Eng while slipping the first clutch CL1, and maintains the slip state of the second clutch CL2, and a both clutch full engagement operation that, while controlling the first clutch CL1 toward the full engagement according to an increase in engine rotation speed Ne, increases the second clutch transmission torque capacity command value tTcl2 as the transmission torque capacity of the second clutch CL2 from the slip state toward the full engagement state. And when the both clutch full engagement operation is performed by the engine start controlling section 400*a*, the second clutch slip amount controlling section 400*b* performs the full engagement operation of the second clutch CL2.

Therefore, it is possible to provide the control device for the hybrid vehicle which is capable of ensuring the acceleration performance while suppressing the engagement shock of the second clutch CL2 at the time of engine start, when shifting the second clutch CL2 from the slip state to the full engagement state after the complete explosion of the engine Eng is attained.

Although the control device for the hybridvehicle has been explained above by reference to the embodiment of the invention, the configuration and the control are not limited to those of the embodiment described above. They include configuration and control undergoing engineering-change and those which are included in the technical scope of the present invention.

For instance, in the above embodiment, the rear-wheel-drive hybrid vehicle is described as the hybrid vehicle. However, the present invention can be applied to a front-wheel-drive hybrid vehicle and an all-wheel drive hybrid vehicle (a four-wheel drive hybrid vehicle).

Further, in the above embodiment, the full engagement operation is executed at the time of the engine start. However, it is not limited to this. That is, the present invention can be applied to a case where the second clutch is shifted from the slip state to the full engagement state, except for the second clutch shift at the engine start. For instance, there is a control that, during the EV travel, maintains the second clutch in a state in which high control response is given by slightly slipping the second clutch. Also in this case, when the second clutch is shifted from a slight slip control mode to the full engagement state, the present invention can be applied.

Furthermore, the above embodiment shows as an example the case where the gradient is changed by two steps of the first increase gradient and the second increase gradient in the full engagement operation. However, as long as the gradient has at least the first increase gradient and the second increase gradient, the gradient could be increased by a plurality of steps that are three steps or more. In this case, by setting each gradient to be gentler as the number of steps increases, the shock at the full engagement of the second clutch can be suppressed.

In addition, the above embodiment shows as an example the case where the increase gradient changing section carries out the increase gradient change from the first increase gradient to the second increase gradient at the time when the second clutch transmission torque capacity reaches the predetermined gradient change threshold value. However, it is not limited to this. For instance, this increase gradient change could be carried out according to other element such as time.

Further, when changing the increase gradient by the gradient change threshold value, in the above embodiment, the gradient change threshold value is variably set according to the acceleration operation and the gear position. However, it is not limited to this. For instance, the gradient change threshold value could be a constant value, or might be set according to either one of the acceleration operation and the gear position.

Moreover, also regarding the increase gradient setting section, the first increase gradient and the second increase gradient are variably set according to the acceleration operation and the gear position. However, it is not limited to this. The first increase gradient and the second increase gradient could be set according to either one of the acceleration operation and the gear position.

Additionally, in the above embodiment, although the control is performed using the second clutch transmission torque capacity command value as the second clutch transmission torque capacity, it is not limited to this. The control could be performed using a measured value.

CROSS-REFERENCES TO RELATED APPLICATIONS

The present application claims priority from Japanese application Tokugan JP2012-280505 filed on Dec. 25, 2012, and the entire contents of Japanese application JP2012-280505 are incorporated herein by reference.

The invention claimed is:

1. A control device for a hybrid vehicle comprising:
an engine and a motor as drive sources;
a first clutch interposed between the engine and the motor;
a second clutch interposed between the motor and a driving wheel; and
a second clutch slip amount controlling section performing a full engagement operation that shifts the second clutch from a slip state to a full engagement state at a time when a predetermined lock-up condition of the second clutch is satisfied in the slip state of the second clutch, and
when the second clutch in the slip state is shifted toward the full engagement state by satisfaction of the lock-up condition of the second clutch in the full engagement operation, the second clutch slip amount controlling section first increasing a transmission torque capacity of the second clutch at a first increase gradient and subsequently increasing the transmission torque capacity of the second clutch at a second increase gradient that is gentler than the first increase gradient.

2. The control device for the hybrid vehicle as claimed in claim 1, wherein:
the second clutch slip amount controlling section has an increase gradient setting section that sets the first increase gradient and the second increase gradient, and
the increase gradient setting section sets each of the first increase gradient and the second increase gradient according to an acceleration operation.

3. The control device for the hybrid vehicle as claimed in claim 1, wherein:
a transmission is interposed between the motor and the driving wheel,
the second clutch slip amount controlling section has an increase gradient setting section that sets the first increase gradient and the second increase gradient, and
the increase gradient setting section sets each of the first increase gradient and the second increase gradient according to a gear position of the transmission.

4. The control device for the hybrid vehicle as claimed in claim 1, wherein:
the second clutch slip amount controlling section has an increase gradient changing section that changes an increase gradient from the first increase gradient to the second increase gradient, and
the increase gradient changing section executes the increase gradient change from the first increase gradient to the second increase gradient at a time when the transmission torque capacity of the second clutch reaches a predetermined gradient change threshold value, and the increase gradient changing section has a gradient change threshold value setting section that sets the gradient change threshold value according to an acceleration operation.

5. The control device for the hybrid vehicle as claimed in claim 1, wherein:
a transmission is interposed between the motor and the driving wheel,
the second clutch slip amount controlling section has an increase gradient changing section that changes an increase gradient from the first increase gradient to the second increase gradient, and
the increase gradient changing section executes the increase gradient change from the first increase gradient to the second increase gradient at a time when the transmission torque capacity of the second clutch reaches a gradient change threshold value, and the increase gradient changing section has a gradient change threshold value setting section that sets the gradient change threshold value according to a gear position of the transmission.

6. The control device for the hybrid vehicle as claimed in claim 1, further comprising:
an engine start controlling section that starts the engine by performing
a second clutch slip operation that increases a driving torque of the motor while slipping the second clutch from an EV mode in which while the first clutch is disengaged, the second clutch is engaged and the motor is driven,
a cranking operation that transmits rotation of the motor to the engine while slipping the first clutch, and maintains the slip state of the second clutch, and
a both clutch full engagement operation that, while controlling the first clutch toward the full engagement according to an increase in engine rotation speed, increases the transmission torque capacity of the second clutch in the slip state toward the full engagement state, and wherein
when the both clutch full engagement operation is performed by the engine start controlling section, the second clutch slip amount controlling section performs the full engagement operation of the second clutch.

\* \* \* \* \*